United States Patent
Rivet

[19]

[11] Patent Number: 5,804,951
[45] Date of Patent: Sep. 8, 1998

[54] POWER FACTOR CORRECTION CIRCUIT

[75] Inventor: Bertrand Rivet, Tours, France

[73] Assignee: SGS-Thomson Microelectronics S.A., Saint Genis, France

[21] Appl. No.: 756,121

[22] Filed: Nov. 25, 1996

[30] Foreign Application Priority Data

Nov. 30, 1995 [FR] France .................................. 95 14380

[51] Int. Cl.$^6$ .............................. G05F 1/613; H02M 7/06
[52] U.S. Cl. ........................................... 323/223; 363/125
[58] Field of Search ..................................... 323/223, 224, 323/220, 265, 222; 363/125, 126; 320/2, 5, 27

[56] References Cited

U.S. PATENT DOCUMENTS

| | | | |
|---|---|---|---|
| 4,792,887 | 12/1988 | Bernitz et al. ............................. | 363/89 |
| 5,003,454 | 3/1991 | Bruning ..................................... | 363/81 |
| 5,012,161 | 4/1991 | Borowiec et al. ....................... | 315/247 |
| 5,406,471 | 4/1995 | Yamanaka ................................ | 363/124 |
| 5,471,376 | 11/1995 | Tsai et al. ................................. | 363/20 |
| 5,502,630 | 3/1996 | Rokhvarg .................................. | 363/84 |
| 5,642,267 | 6/1997 | Brkovic et al. ........................... | 363/16 |

OTHER PUBLICATIONS

Patent Abstracts of Japan, vol. 018, No. 570 (E–1623), Oct. 31, 1994 & JP–A–06 209574 (Sony Corp).
Patent Abstracts of Japan, vol. 007, No. 117 (P–198), May 21, 1983 & JP–A–58 037717 (Hitachi Seisakusho KK).

*Primary Examiner*—Adolf Berhane
*Attorney, Agent, or Firm*—Wolf, Greenfield & Sacks, P.C.; James H. Morris

[57] ABSTRACT

A power factor correction device of a rectifier bridge supplied by an a.c. voltage for providing, by means of at least two capacitors, a rectified d.c. supply, comprises between two rectified supply lines a charge path of each capacitor; a switchable discharge path of each respective capacitor; a first control block for closing a first discharge path associated to a first capacitor only after the a.c. supply voltage crosses a maximum value; and a second control block for closing a second discharge path associated to a second capacitor at the expiry of a predetermined delay following the closing of the previous discharge path.

13 Claims, 6 Drawing Sheets

POWER FACTOR CORRECTION CIRCUIT

BACKGROUND OF THE INVENTION

1. Field of the Invention

The present invention relates to the field of rectified power supplies obtained from an a.c. voltage, for example the mains a.c. voltage, and designed especially for a switched mode supply system.

2. Discussion of the Related Art

A rectifier is generally comprised of a diode bridge connected to an a.c. supply and providing a rectified d.c. voltage to a storage capacitor connected between the output terminals of the rectifier. The rectified d.c. supply is, for example, provided to a power converter, such as a switched mode power supply.

Conventional rectifiers are generally associated to so-called power factor correction circuits which are designed, in particular, to widen the current pulse taken from the mains at each half period of the mains.

Among the existing solutions for correcting the power factor, a circuit is known which uses an inductor and a diode connected in series between a rectified supply terminal and a first terminal of a capacitor. One terminal of a switch is connected between the inductor and the diode and the other to ground. A processor suitably controls the switch depending on the detected voltage and current. Such a circuit, available for example at SGS-Thomson Microelectronics under reference L6560, allows to obtain an almost perfect correction of the power factor, i.e. the charge current of the storage capacitor has a sinusoidal shape in phase with the sinusoidal voltage. A drawback of such a power factor correction circuit is due to the presence of a non-integrable and expensive inductor.

Other power factor correction circuits are also known, which are realized from diodes and resistors, but these circuits cause important losses in the resistors, which reversely affect the efficiency of the converter.

SUMMARY OF THE INVENTION

An object of the present invention is to provide a power factor correction circuit which may entirely be realized from semiconductor components.

According to a first aspect, the present invention aims at providing such a device which has a particularly simple and inexpensive structure.

Another object of the present invention is to make the operation of the device independent of the variations of the a.c. supply voltage of the rectifier and of the load connected to the rectifier.

Another object of the invention is to provide such a device which may operate in a large range of powers. In particular, the invention aims at obtaining low energy losses in the circuit during an operation at high power.

According to a second aspect, the present invention also aims at providing such a device whose operation is not altered by the technological dispersions of the used components.

According to this second aspect, the present invention aims at realizing the power factor correction device in the form of an integrated circuit with minimum silicon surface area necessary to the circuit.

For achieving these objects, the present invention provides a power factor correction device of a rectifier bridge supplied by an a.c. voltage for providing, by means of at least two capacitors, a rectified d.c. supply, comprising between two rectified supply lines a charge path of each capacitor, the successive capacitors having decreasing values and decreasing charge time constants; a switchable discharge path of each respective capacitor; a first control block for closing a first discharge path associated to a first capacitor only after the a.c. supply voltage crosses a maximum value; and at least one second control block for closing a second discharge path associated to a second capacitor at the expiry of a predetermined delay following the closing of the previous discharge path.

According to an embodiment of the invention, the closing of the second discharge path causes the opening of the first discharge path.

According to an embodiment of the invention, a charge path comprises a resistor and a diode connected in series between the rectified supply lines, and a discharge path comprises a switch connected in parallel to the resistor and the diode of the charge path to which it is associated.

According to an embodiment of the invention, the second control block is triggered by the closing of the first switch.

According to an embodiment of the invention, the second control block comprises a resistor for detecting the current in the discharge path of the first capacitor and a Zener diode for limiting the voltage across this detection resistor.

According to an embodiment of the invention, the first control block determines a threshold voltage for closing the first switch.

According to an embodiment of the invention, the first control block determines a first delay for closing the first switch after each zero-crossing of the a.c. supply voltage.

According to an embodiment of the invention, the limiting Zener diode is part of the charge path of the first capacitor.

According to an embodiment of the invention, the second control block determines a second delay for closing the second switch after each zero-crossing of the a.c. supply voltage, the second delay being greater than the first delay determined by the first control block.

According to an embodiment of the invention, the first control block comprises a first comparator having a first input connected to the middle points of bridges for dividing and clipping the a.c. supply voltage, a second input of the first comparator receiving a first voltage reference; a second comparator having a first input receiving, through a first damping circuit, an output signal of the first comparator, a second input of the second comparator receiving a second voltage reference; and a first derivator receiving an output signal of the second comparator and delivering pulses at the frequency of the a.c. supply and phase-shifted of said first delay, an output signal of the first derivator constituting a control signal of a first thyristor forming the first switch.

According to an embodiment of the invention, the second control block comprises a third comparator having a first input receiving, through a second damping circuit having a time constant greater than that of the first damping circuit, the output signal of the first comparator, a second input of the third comparator receiving a third voltage reference; and a second derivator receiving an output signal of the third comparator and delivering pulses at the frequency of the a.c. supply and phase-shifted of said second delay greater than the first delay, an output signal of the second derivator constituting a control signal of a second thyristor forming the second switch.

According to an embodiment of the invention, the device comprises a third thyristor connected in parallel to the first thyristor, the gate of the third thyristor being connected to a triggering Zener diode determining a voltage threshold above which the third thyristor short-circuits the first switch.

According to an embodiment of the invention, the device further comprises an additional filtering block constituting an additional discharge path of the first capacitor for delivering a low d.c. voltage for supplying said comparators and low voltage circuitry associated therewith, said low voltage being determined by a Zener diode.

The foregoing and other objects, features, aspects and advantages of the invention will become apparent from the following detailed description of embodiments, given by way of illustration and not of limitation with reference to the accompanying drawings.

BRIEF DESCRIPTION OF THE DRAWINGS

For sake of clarity, same elements are designated by same reference characters in the different figures. Similarly, the time diagrams of FIGS. 2 and 6 are not to scale.

DETAILED DESCRIPTION OF THE PREFERRED EMBODIMENTS

A power factor correction device according to the invention, as shown in the different figures, comprises at least two storage capacitors C1 and C2, downstream from a conventional rectifying bridge 1. Bridge 1 is connected to two terminals E1 and E2 of an a.c. supply, for example the mains. A rectified d.c. supply is delivered on two output terminals, respectively positive A' and negative G, terminal G generally constituting the ground terminal. A charge path is defined for each capacitor C1 or C2 between the positive A–A' and negative G supply lines.

The charge path of capacitor C1 comprises at least one diode D1 and one resistor R1 connected in series. The charge path of capacitor C2 comprises at least one diode D2 and one resistor R2 connected in series.

Each capacitor C1 or C2 is also associated to a switchable discharge path. The discharge path of capacitor C1 is comprised of a switch K1 connected in parallel to diode D1 and resistor R1. The discharge path of capacitor C2 is comprised of a switch K2 connected in parallel to diode D2 and resistor R2.

The charge paths are designed so that their respective capacitors have distinct charge time constants. Capacitor C1 and resistor R1 have higher values than the respective values of capacitor C2 and resistor R2, so that R1.C1>>R2.C2.

Figure 1:
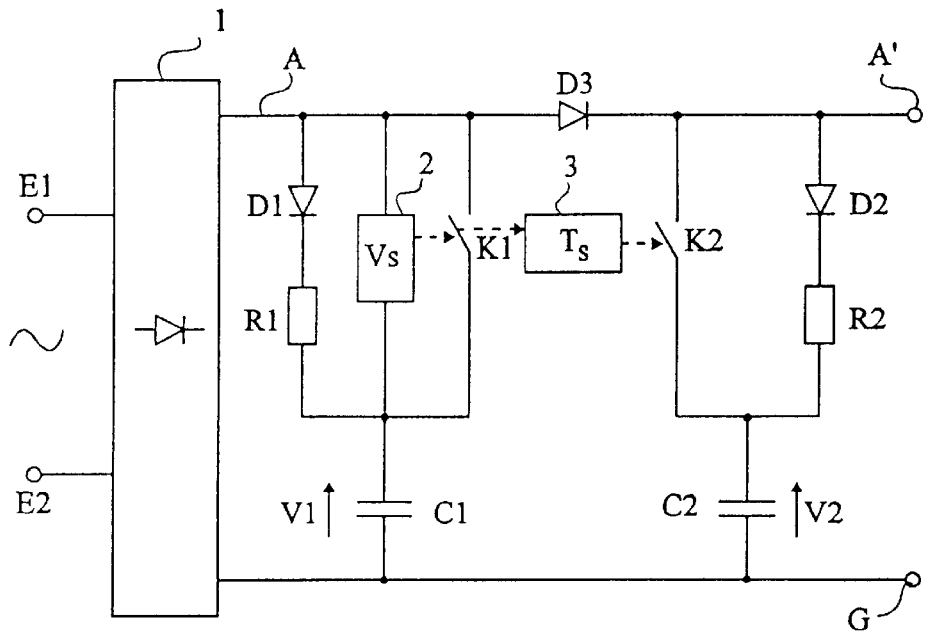
FIG. 1 shows, partially in the form of blocks, a rectifier associated to a first embodiment of a power factor correction device according to a first aspect of the present invention.

FIG. 1 shows a first embodiment of a device according to a first aspect of the invention.

In this embodiment, a first terminal of each capacitor C1 or C2 is connected to terminal G. The series assembly of the diode, respectively D1 or D2, and of the resistor, respectively R1 or R2, is placed between the second terminal of the capacitor, respectively C1 or C2, and line A–A'. A protection diode D3 is connected between the terminals A and A' so that the discharge current of capacitor C2 does not charge capacitor C1.

Each switch K1 or K2 is associated to a control block, respectively 2 or 3. The role of blocks 2 and 3 is to cause the sequential switching of switches K1 and K2. Block 2 has the role of closing switch K1 when the voltage V1 across capacitor C1 becomes greater than the voltage across terminals A and G, plus a threshold Vs.

According to the invention, block 3 has the role of causing switch K2 to close after a delay Ts following the closing of switch K1, i.e. to force a partial discharge of capacitor C1 before the discharge of capacitor C2.

Figure 2:
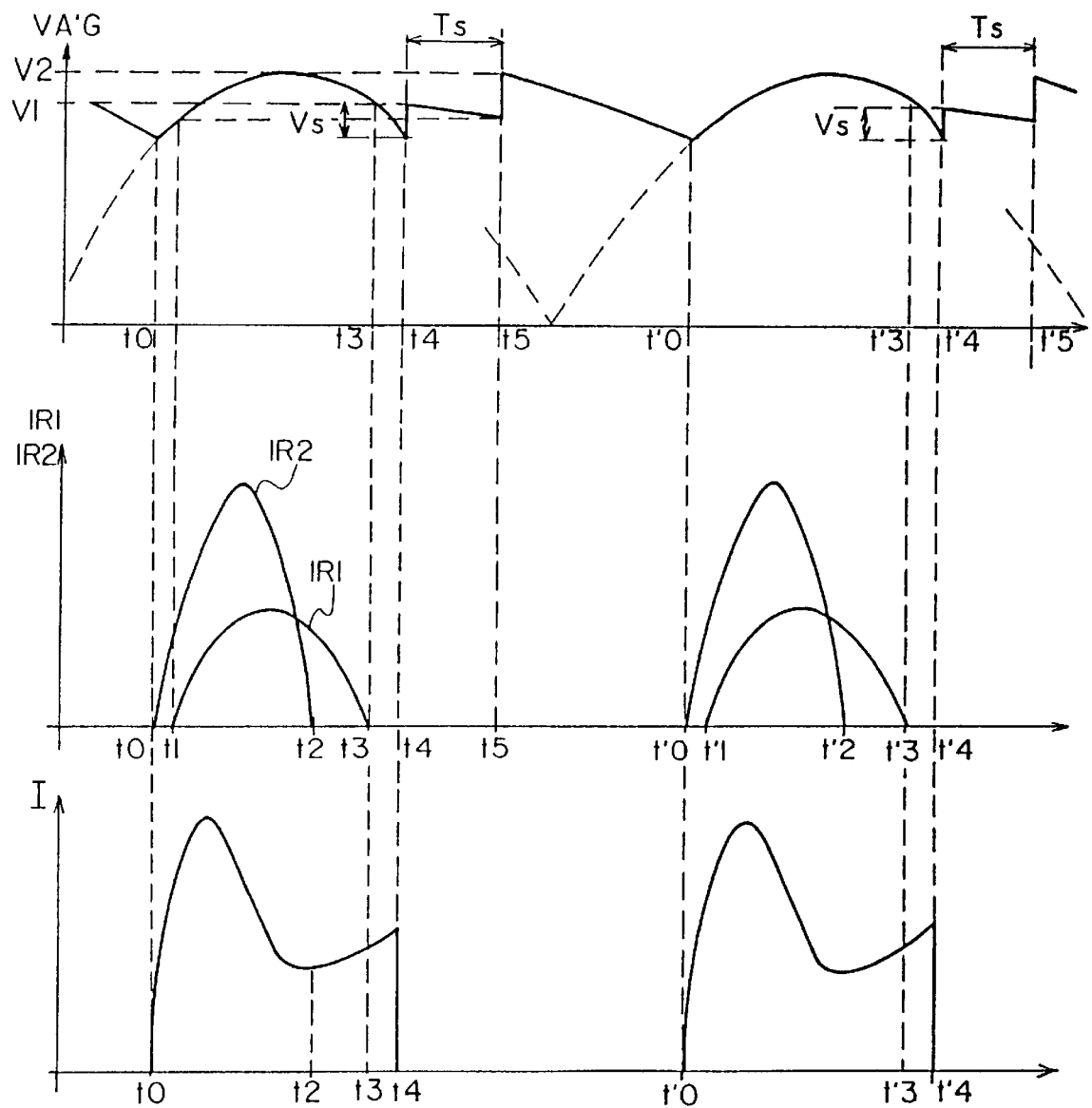
FIG. 2 illustrates, in the form of time diagrams, the operation of a device according to the present invention as shown in FIG. 1.

The operation of the device according to the invention such as shown in FIG. 1 is illustrated by FIG. 2. FIG. 2 shows, in the form of time diagrams, the voltage $V_{A'G}$ across the load, the currents IR1 and IR2 in resistors R1 and R2, and the current I provided by the mains.

At a time t0 where voltage $V_{A'G}$ reaches the voltage V2 across capacitor C2, switch K2 opens. The mains thus supplies the load and starts to charge capacitor C2. Soon after, at a time t1, it starts to charge capacitor C1 which is less discharged than capacitor C2. It should be remarked that the charge of capacitor C1 is slower than the charge of capacitor C2.

Capacitor C2 charges up to a time t2. Capacitor C1 stops charging only at a later time t3. The mains continues to supply the load up to a time t4 where the voltage difference between the rectified mains voltage and voltage V1 reaches the threshold voltage Vs. Switch K1 closes and capacitor C1 slowly discharges into the load. Current I cancels.

After the delay Ts determined by block 3 (time t5), switch K2 closes and switch K1 opens, thus causing the supply of the load by the discharge of capacitor C2. When the discharge of capacitor C2 is such that voltage V2 becomes smaller than voltage $V_{A'G}$, switch K2 opens (time t'0) and the above-described operation resumes for the next half period.

As shown by the waveforms, the sum of the various currents (IR1, IR2 and the current in the load), constituting the current I taken from the mains, allows a suitable widening of the current pulse extracted from the mains.

An advantage of the provision of the delay 3, is that the closing of switch K2 is independent of the load connected between terminals A' and G.

Figure 3:
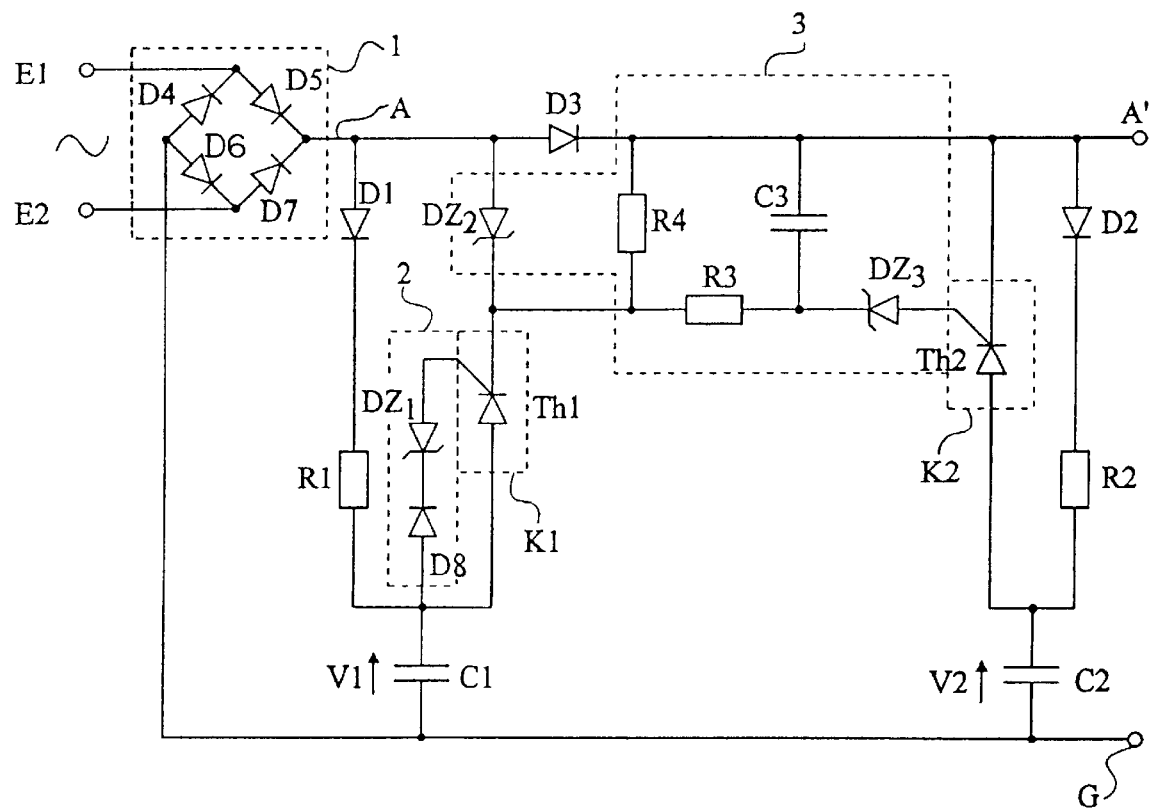
FIG. 3 shows a detailed electrical diagram of an embodiment of the device shown in FIG. 1.

FIG. 3 shows an embodiment of the blocks 2 and 3 of the device of FIG. 1.

Rectifier 1 is constituted, conventionally, of a diode bridge D4–D7. Switches K1 and K2 are constituted, for example, of thyristors Th1 and Th2 whose anodes are connected, respectively, to capacitor C1 and to capacitor C2.

Block 2 comprises a Zener diode DZ1 and a diode D8 connected in series between the cathode gate of thyristor Th1 and capacitor C1. The threshold voltage Vs for closing thyristor Th1 is fixed by Zener diode DZ1, taking diode D8 into account.

Block 3 comprises a Zener diode DZ2 connected between terminal A and the cathode of thyristor Th1. The role of diode DZ2 is to avoid a triggering of delay block 3 before thyristor Th1 switches on. A resistor R3 and a low voltage capacitor C3 are connected in series and in parallel to diodes DZ2 and D3. The connection node between capacitor C3 and resistor R3 is coupled to the cathode of a Zener diode DZ3 whose anode is connected to the cathode gate of thyristor Th2. A resistor R4 is connected in parallel to diodes DZ2 and D3.

When thyristor Th1 is on (from time t4), capacitor C3 charges with a time constant determined by resistor R3. When the voltage across capacitor C3 becomes greater than the threshold of Zener diode DZ3, the latter breaks over and controls the switching-on of thyristor Th2. From this time (time t5), capacitor C2 discharges and the cathode voltage of thyristor Th1 rapidly rises and thyristor Th1 turns off. Resistor R4 allows the discharge of capacitor C3 when thyristor Th2 turns on. At time t'0, thyristor Th2 turns off and capacitor C2, and then capacitor C1 (time t'1) start charging again.

Figure 4:
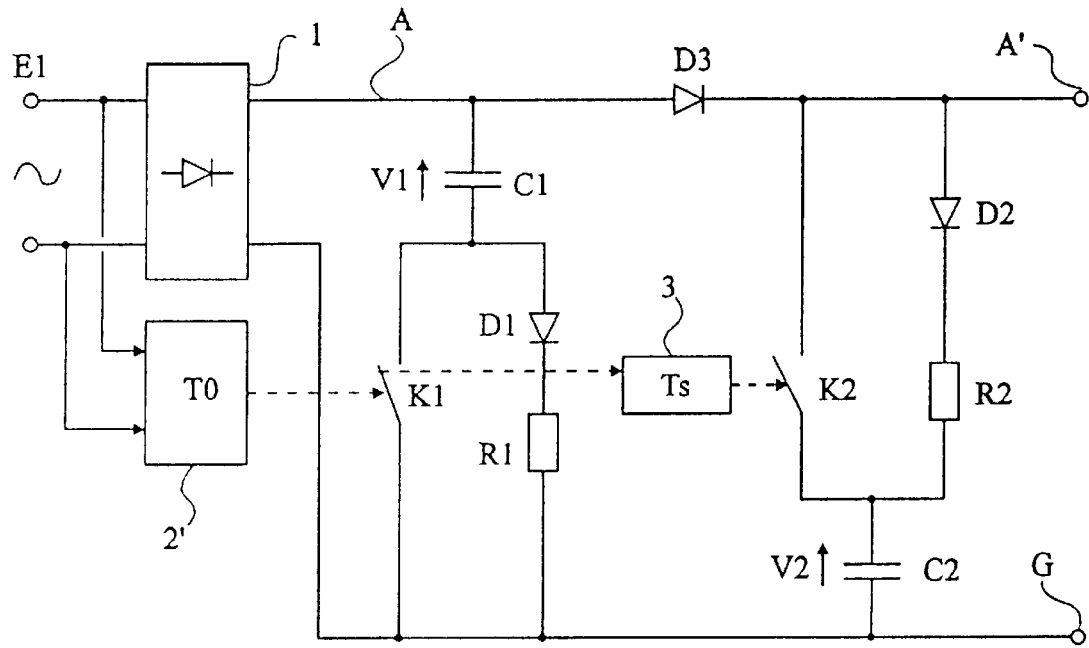
FIG. 4 shows, partially in the form of blocks, a second embodiment of a power factor correction device according to the first aspect of the present invention.
Figure 5:
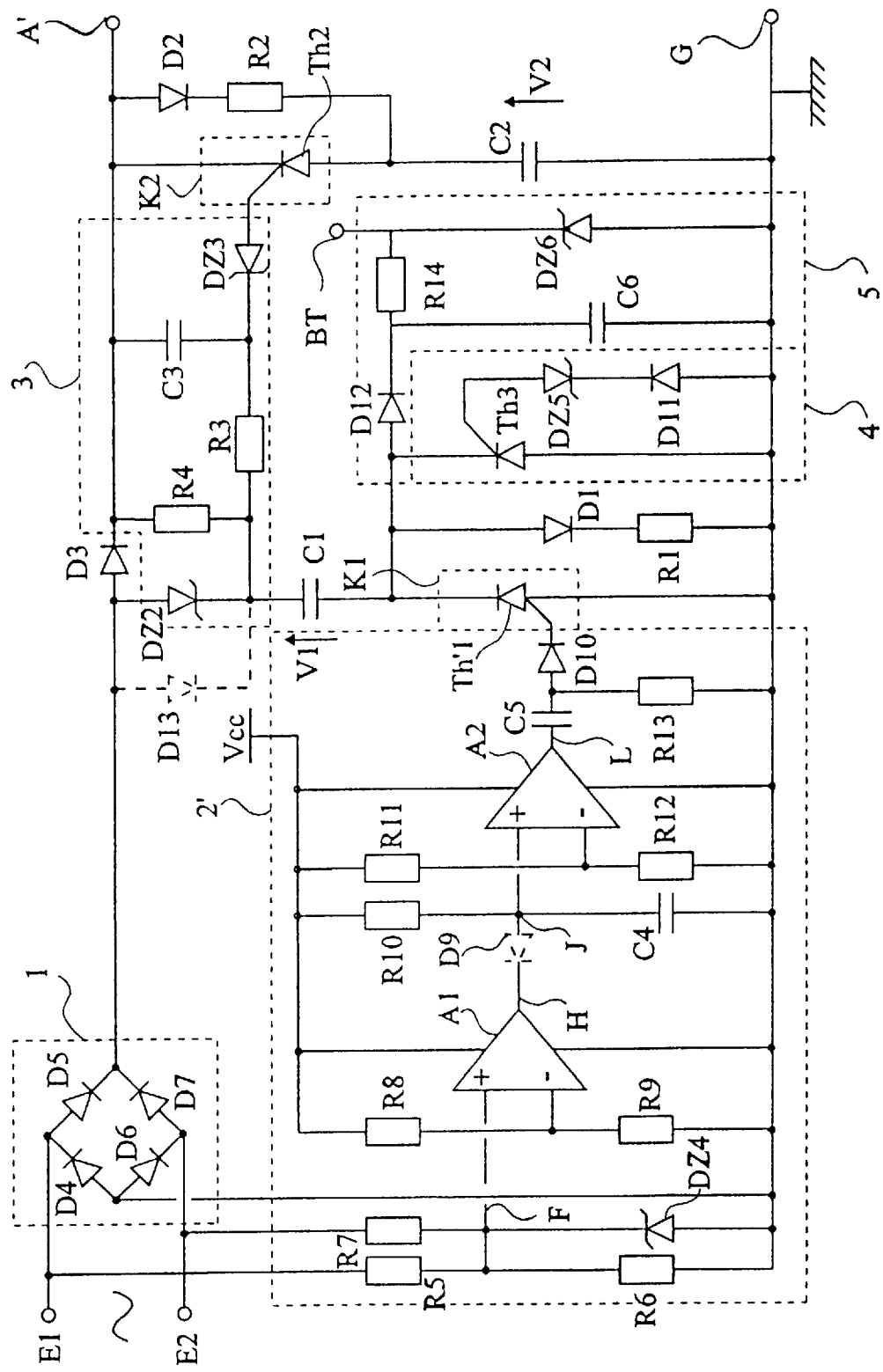
FIG. 5 shows a detailed electrical diagram of an embodiment of the device shown in FIG. 4.

FIGS. 4 and 5 show a second embodiment of a power factor correction device according to the first aspect of the invention. FIG. 4 shows this device partially in the form of blocks, while FIG. 5 is a detailed electrical diagram.

In this second embodiment, the control block 2' of switch K1 is also a delay block. Block 2' is designed to close switch K1 a predetermined delay T0 after a zero-crossing of the mains. The position of capacitor C1 is inverted with respect to the first embodiment. A first terminal of capacitor C1 is connected, through diode D1 and resistor R1 and through switch K1, to terminal G and the second terminal of capacitor C1 is connected to terminal A.

Block 3 associated to switch K2 is similar to that described in relation with FIGS. 1 and 3.

An advantage of such an embodiment is that it avoids a second closing of switch K1 during a same half period. This avoids the occurrence of large energy losses in resistor R1 (FIG. 3) when capacitor C2 discharges too rapidly and thus causes a difference between voltages V1 and V2 which reaches the threshold voltage Vs, causing thyristor Th1 to turn on. Such a case may arise, for example, when the power taken by the load dramatically increases.

Another advantage is that the operation of block 2' is made independent of the variations of the mains voltage.

The control of switch K1 is achieved, for example, by a pulse provided by block 2'. This allows to maintain a control of the opening of switch K1 by the closing of switch K2. The remaining operation is similar to that explained in relation with FIG. 1.

FIG. 5 illustrates an exemplary realization of the control block 2' shown in FIG. 4. Block 3 has the same structure as that explained in relation with FIG. 3. The second terminal of capacitor C1 is connected, through Zener diode DZ2, to terminal A. Diode DZ2 is thus, with diode D1 and resistor R1, in the charge path of capacitor C1.

The exemplary structure shown in FIG. 5 will be described hereafter with reference to FIG. 6 which illustrates, in the form of time diagrams, the waveforms of the most significant voltages in block 2'.

Block 2' comprises two comparators A1 and A2. The role of comparator A1 is to detect the zero-crossing of the mains voltage $V_{E1E2}$. The role of comparator A2 is to enable a delay of the output signal of comparator A1.

A first (non inverting) input F of comparator A1 receives the rectified mains voltage, converted into a low voltage by dividing bridges comprised of resistors R5, R7 and R6 and clipped by a Zener diode DZ4.

Figure 6:
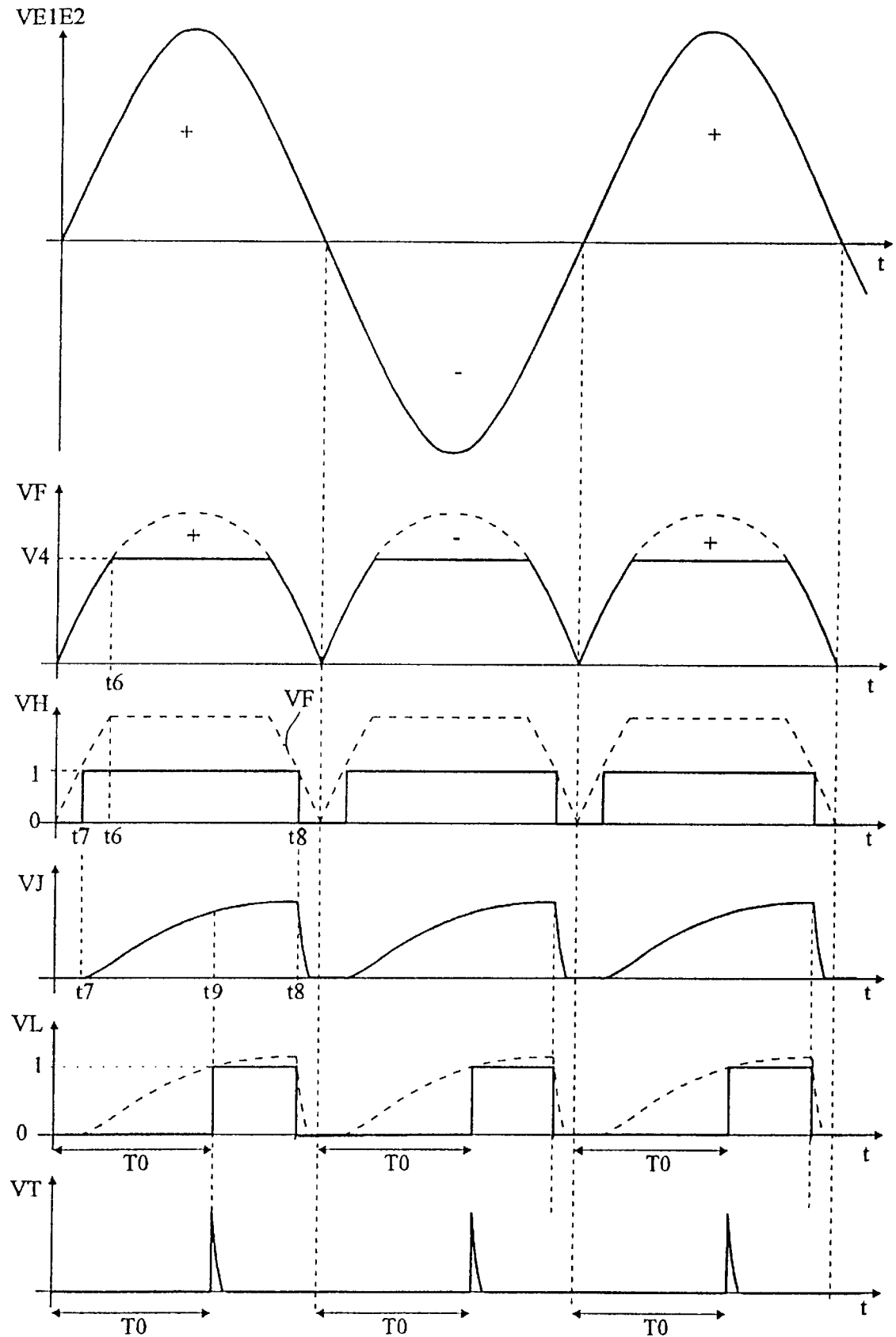
FIG. 6 illustrates, in the form of time diagrams, the operation of the device shown in FIG. 5.

The waveform of voltage $V_F$ at node F is shown in FIG. 6. As long as voltage $V_F$ does not reach threshold voltage V4 of diode DZ4, its waveform corresponds to the sinusoidal form of the supply voltage, but with a lower level, due to the presence of the divider bridges defined by resistors R5 and R6, for the positive half period, and by resistors R7 and R6 for the negative half period. As soon as voltage $V_F$ reaches voltage V4 (time t6), diode DZ4, connected in parallel to resistor R6, conducts and limits the voltage.

A second input of comparator A1 receives a first reference voltage defined by a divider bridge comprised of resistors R8 and R9 connected in series between a positive low d.c. supply voltage terminal Vcc and terminal G. The role of comparator A1 is to convert the voltage at node F into a squarewave. Voltage $V_H$ at the output H of comparator A1 is shown in FIG. 6. This voltage $V_H$ is high (times t7 to t8) when the voltage at node F exceeds the first reference voltage and is low in the vicinity of the zero-crossings of the mains voltage.

Voltage $V_H$ is a reference for the delay achieved by block 2'. For this purpose, a first damping circuit for the rising edges of signal $V_H$, comprising a resistor R10 and a capacitor C4 connected in series between terminals Vcc and G, is connected between the output H and a first input J of comparator A2. An isolating diode D9 (shown in dashed-lines in FIG. 5) isolates, if necessary, the output H from node J.

A second input of comparator A2 receives a second reference voltage determined by a dividing bridge comprised of resistors R11 and R12 connected in series between terminals Vcc and G.

When the voltage at node H goes high, the capacitor C4 charges through resistor R10 and thus causes a progressive increase of voltage $V_J$ (FIG. 6) at node J. When voltage $V_J$ reaches the second reference voltage (time t9), the output L of comparator A2 goes high. As soon as the voltage at node H goes low (time t8), capacitor C4 is immediately short-circuited by the output of comparator A1 and the output L goes low again. A squarewave signal $V_L$ (FIG. 6) is thus obtained at node L, the rising edges of which are all delayed, with respect to the zero-crossings of the a.c. supply voltage, of a time T0.

In FIG. 6, the output states of comparators A1 and A2 are designated by "0" and "1". The value of the respective voltages depends on the supply Vcc of these comparators, and the dimensioning of the various resistor bridges and of capacitors C4 and C5 is, of course, suitably adapted.

The output L is connected to a first derivator, comprised of a capacitor C5 associated to a resistor R13, whose role is to convert the squarewave of signal $V_L$ into pulses. A first terminal of capacitor C5 is connected to the output of comparator A2, whereas a second terminal is connected, through resistor R13, to terminal G. The second terminal of capacitor C5 is connected to the anode of a diode D10 whose cathode constitutes the output of block 2'. This output is connected to the anode gate of a thyristor Th'1 constituting switch K1. Diode D10 is a protection diode for avoiding the flow of a current from the gate of thyristor Th'1 to the output L of comparator A2.

The waveform of the output voltage $V_T$ of block 2' is shown in FIG. 6. This voltage comprises pulses at the frequency of the mains which are phase-shifted by the delay T0 with respect to the zero-crossings of the mains voltage.

The various resistor bridges of block 2', the Zener diode DZ4, capacitor C4 and resistor R10 are dimensioned so that the pulses delivered by block 2' are located within the decreasing portion of each rectified half period, i.e. the delay T0 is greater than one quarter period of the mains.

An advantage of the clipping of the voltage at node F by Zener diode DZ4 is that it makes the operation of block 2', thus the delay T0, independent of the variations of the mains voltage.

The operation of the device shown in FIG. 5 as concerns the respective charging and discharging of capacitors C1 and C2, is substantially similar to that explained with reference to the first embodiment.

The device shown in FIG. 5 additionally comprises a block 4 ensuring the supply of the load connected between terminals A' and G, even in case the mains are down. This block 4 comprises a thyristor Th3 connected in parallel to thyristor Th'1. The gate of thyristor Th3 is connected to the anode of a triggering Zener diode DZ5 whose cathode is connected to terminal G through a diode D11. Thyristor Th3 and diode DZ5 serve, by short-circuiting thyristor Th'1, to completely discharge capacitor C1 when the difference between voltages V1 and $V_{A'G}$ becomes greater than the threshold determined by diodes DZ5 and D11.

Thus, if the mains voltage disappears during a discharge period of capacitor C2, capacitor C1 takes over and maintains the supply during one or two half periods of the mains.

The low voltage Vcc may be provided by a supply circuit external to the device. However, it is preferable to use the discharge of capacitor C1 to deliver a d.c. voltage Vcc to a low voltage terminal BT. For this purpose, the device according to the invention comprises an additional filtering block 5 provided with a capacitor C6 which is charged by the discharge of capacitor C1. Block 5 comprises a diode D12 whose anode is connected to the cathode of thyristor Th'1 and whose cathode is connected to a first terminal of a resistor R14 whose other terminal constitutes the output of block 5 and, through capacitor C6, to terminal G. A Zener diode DZ6, connected in parallel to capacitor C6 and resistor R14, determines the d.c. voltage Vcc delivered by block 5.

In the case where block 5 is provided in the device according to the invention, block 4 additionally serves to assist the supply start-up of comparators A1 and A2 by ensuring that capacitor C1 is at least partially discharged when the circuit is powered-on.

As shown by dotted lines in FIG. 5, an additional relief diode D13 may be connected in parallel to Zener diode DZ2 in which all the charge current of capacitor C1 flows. The role of diode D13 is then to relieve Zener diode DZ2 from the charging of capacitor C1.

Figure 7:
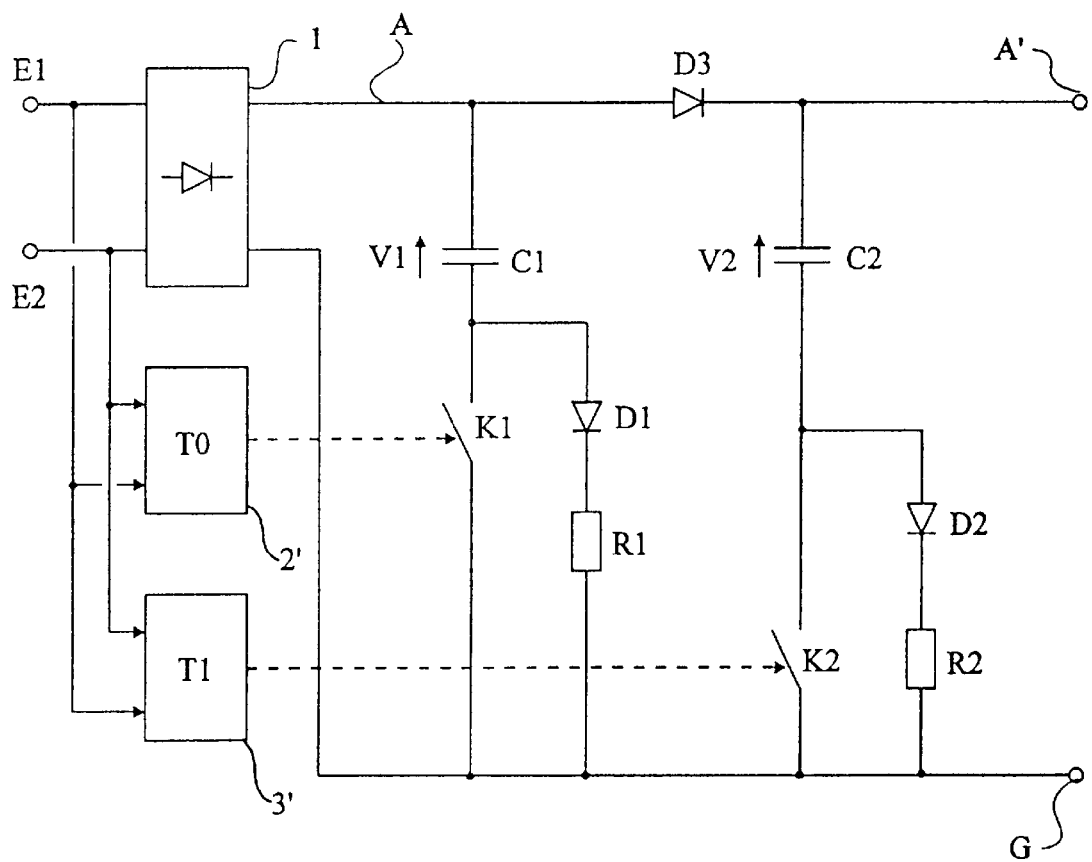
FIG. 7 shows, partially in the form of blocks, an embodiment of a power factor correction device according to a second aspect of the present invention.
Figure 8:
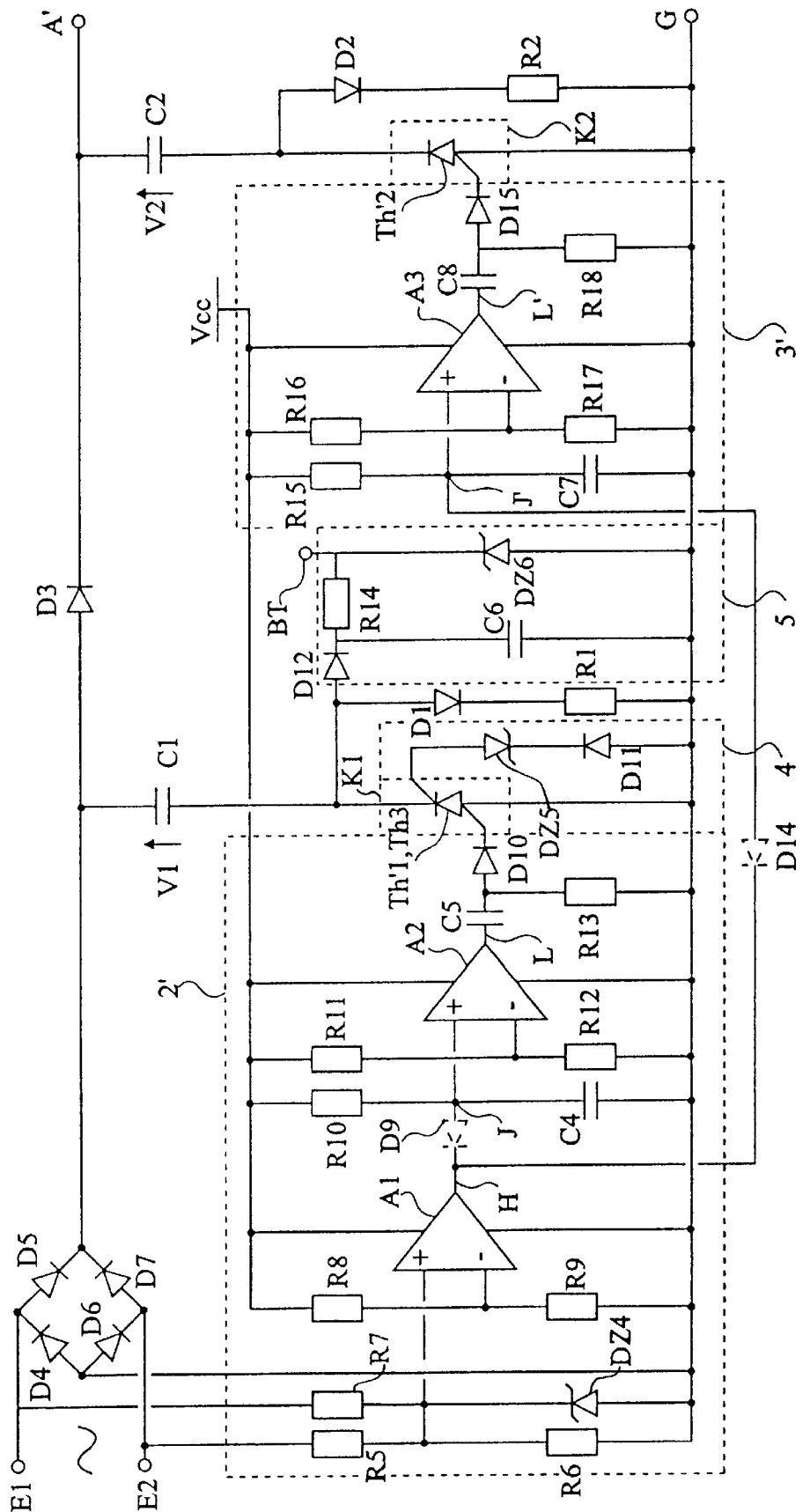
FIG. 8 shows a detailed electrical diagram of an embodiment of the device shown in FIG. 7.

FIGS. 7 and 8 illustrate a second aspect of the present invention according to which the delayed controls of switches K1 and K2 are made independent the one of the other.

Switch K2 is, like switch K1, associated to a delay block 3' for triggering it after a predetermined delay T1 following the zero-crossing of the mains voltage. The structure of the charge and discharge paths of capacitor C2 is similar to that of the charge and discharge paths of capacitor C1 shown in FIG. 4.

The delay T0 of block 2' for closing switch K1 is determined like in the embodiment illustrated in FIGS. 4 and 5. The delay T1 of block 3' for closing switch K2 is chosen greater than delay T0 to ensure a closing of switch K2 after the closing of switch K1.

An advantage of this second aspect of the invention is that the closing delay of switch K2 may be achieved by low voltage components such as those used in the embodiment of FIG. 5. This has the advantage of making this delay independent of the threshold of a Zener diode (diode DZ2 in FIGS. 3 and 5) whose fabrication tolerances are relatively large (in the order of ±10%) in production. Thus the delay is determined by resistors and capacitors whose fabrication tolerances may be of the order of 1% in production.

Another advantage of this second aspect is that the implementation of the device in the form of an integrated circuit requires less silicon for the portion of the circuit comprising the power components, which limits the energy losses.

FIG. 8 shows an electrical diagram of an embodiment of a power factor correction device according to the second aspect of the present invention.

The structure and operation of block 2' associated to switch K1 are identical to the structure and operation explained in relation with FIGS. 4 to 6. Similarly, block 5 is identical to that described in relation with FIG. 5. In contrast, the second terminal of capacitor C1 is directly connected to terminal A'.

It will be remarked that, in the embodiment shown in FIG. 8, thyristors Th'1 and Th3, respectively constituting switch K1 and block 4, are merged. According to this embodiment, a double-gate thyristor is used, the anode and cathode gates constituting the respective controls of switch K1 and of block 4.

According to the embodiment shown in FIG. 8, block 3' receives the squarewave present at node H and comprises a similar circuit to that associated to comparator A2 of block 2'.

Block 3' comprises a third comparator A3, for example an operational amplifier, a first input G' of which receives signal $V_H$, whose rising edges are heavily damped by a second damping circuit comprised of a resistor R15 and a capacitor C7. If necessary, an isolation diode D14 (shown in dashed lines in FIG. 8) is connected between nodes H and G'. The second input of comparator A3 receives a third reference voltage determined by a dividing bridge comprised of resistors R16 and R17 connected in series between terminal Vcc and terminal G. The dimensioning of resistors R15, R16 and R17 and of capacitor C7 determine the delay T1 associated to switch K2. The output L' of comparator A3 crosses a second derivator comprised of a capacitor C8 associated to a resistor R18. The gate of thyristor Th'2 constituting switch K2 is controlled through a diode D15.

The operation of block 3' is similar to that of block 2' explained in relation with FIG. 6. It will be remarked that switch K2 is, according to the second aspect of the invention, always closed after a delay (T1-T0) which follows the closing of switch K1.

Although the previous description refers to a device comprising two storage capacitors C1 and C2, the invention may be realized with a higher number of capacitors. In that case, it will be ensured that the capacitors have increasing values and increasing charge time constants. Moreover, it should be ensured that the closing delays of the switches, respectively associated to the various capacitors, increase so that the capacitors discharge successively. The choice of the values of the resistors and capacitors depends on the desired characteristics for the power factor limiting device. The values depend especially on the number of storage capacitors C1 and C2 and on the charge and discharge time constants of these capacitors.

Of course, various alternatives and modifications of the present invention will appear to those skilled in the art. In particular, each of the described components may be replaced by one or several components ensuring the same function. For example, the thyristors may be replaced by power MOS transistors. The time constants such as T0 and T1 may be generated differently than what has been described, for example by a microcontroller.

Such alterations, modifications, and improvements are intended to be within the spirit and the scope of the present invention. Accordingly, the foregoing description is by way of example only and is not intended as limiting. The present invention is limited only as defined in the following claims and the equivalents thereto.

What is claimed is:

1. A power factor correction device of a rectifier bridge supplied by an a.c. voltage for providing, by means of at least two capacitors, a rectified d.c. supply, comprising between two rectified supply lines:
   a charge path of each capacitor, the successive capacitors having decreasing values and decreasing charge time constants;
   a switchable discharge path of each respective capacitor;
   a first control block for closing a first discharge path associated to a first capacitor only after the a.c. supply voltage crosses a maximum value; and
   characterized in that it further comprises
      at least one second control block for closing a second discharge path associated to a second capacitor at the expiry of a predetermined delay following the closing of the previous discharge path.

2. The device of claim 1, wherein the closing of the second discharge path causes the opening of the first discharge path.

3. The device according to claim 1, wherein a charge path comprises a resistor and a diode connected in series between the rectified supply lines, and a discharge path comprises a switch connected in parallel to the resistor and the diode of the charge path to which it is associated.

4. The device according to claim 3, wherein the second control block is triggered by the closing of the first switch.

5. The device according to claim 4, wherein the second control block comprises a resistor for detecting the current in the discharge path of the first capacitor and a Zener diode for limiting the voltage across this detection resistor.

6. The device according to claim 3, wherein the first control block determines a threshold voltage for closing the first switch.

7. The device according to claim 3, wherein the first control block determines a first delay for closing the first switch after each zero-crossing of the a.c. supply voltage.

8. The device according to claim 5, wherein said limiting Zener diode is part of the charge path of the first capacitor.

9. The device according to claim 3, wherein the second control block determines a second delay for closing the second switch after each zero-crossing of the a.c. supply voltage, the second delay being greater than the first delay determined by the first control block.

10. The device according to claim 7, wherein the first control block comprises:
    a first comparator having a first input connected to the middle points of bridges for dividing the clipping the a.c. supply voltage, a second input of the first comparator receiving a first voltage reference;
    a second comparator having a first input receiving, through a first damping circuit, an output signal of the first comparator, a second input of the second comparator receiving a second voltage reference; and
    a first derivator receiving an output signal of the second comparator and delivering pulses at the frequency of the a.c. supply and phase-shifted of said first delay, an output signal of the first derivator constituting a control signal of a first thyristor forming the first switch.

11. The device according to claim 9, wherein the second control block comprises:
    a third comparator having a first input receiving, through a second damping circuit having a time constant greater than that of the first damping circuit, the output signal of the first comparator, a second input of the third comparator receiving a third voltage reference; and
    a second derivator receiving an output signal of the third comparator and delivering pulses at the frequency of the a.c. supply and phase-shifted of said second delay greater than the first delay, an output signal of the second derivator constituting a control signal of a second thyristor forming the second switch.

12. The device according to claim 10, comprising a third thyristor connected in parallel to the first thyristor, the gate of the third thyristor being connected to a triggering Zener diode determining a voltage threshold above which the third thyristor short-circuits the first switch.

13. The device according to claim 10, further comprising an additional filtering block constituting an additional discharge path of the first capacitor for delivering a low d.c. voltage for supplying said comparators and low voltage circuitry associated therewith, said low voltage being determined by a Zener diode.

* * * * *